T. S. LEAKE.
APPARATUS FOR PREPARING AND HANDLING CONCRETE.
APPLICATION FILED APR. 18, 1912.

1,215,560.

Patented Feb. 13, 1917.
5 SHEETS—SHEET 1.

Witnesses:
John Enders
Henry A. Parks

Inventor:
Thomas S. Leake
by Sheridan, Wilkinson, Scott & Richmond
Attys.

T. S. LEAKE.
APPARATUS FOR PREPARING AND HANDLING CONCRETE.
APPLICATION FILED APR. 18, 1912.
1,215,560. Patented Feb. 13, 1917.
5 SHEETS—SHEET 2.
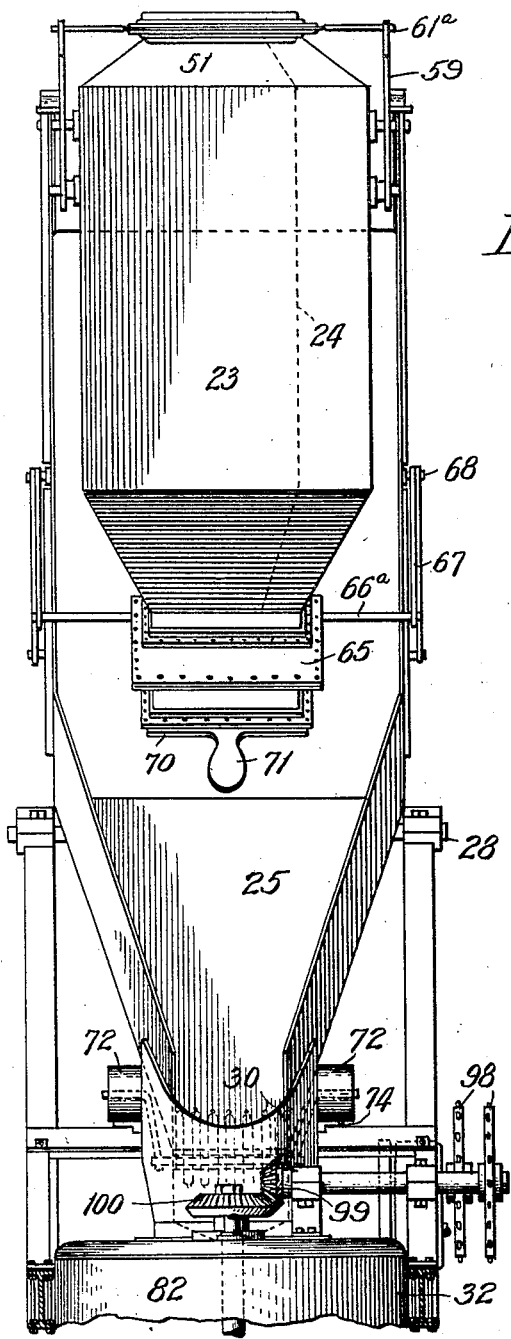
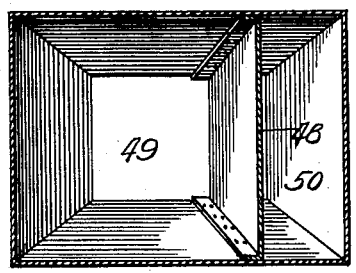
Witnesses:
John Enders
Henry A. Parks
Inventor:
Thomas S. Leake,
by Sheridan, Wilkinson, Scott and Richmond
Attys

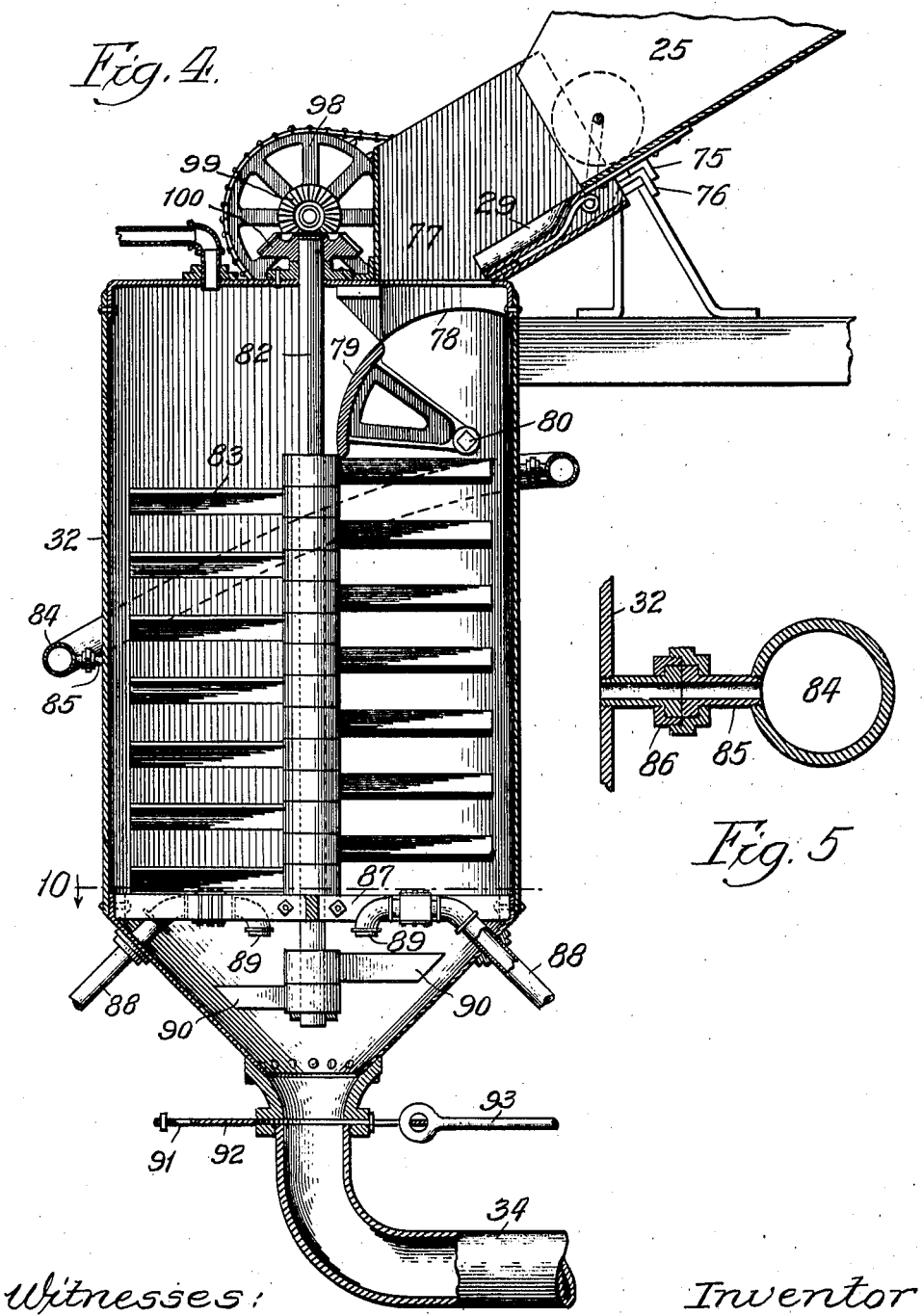

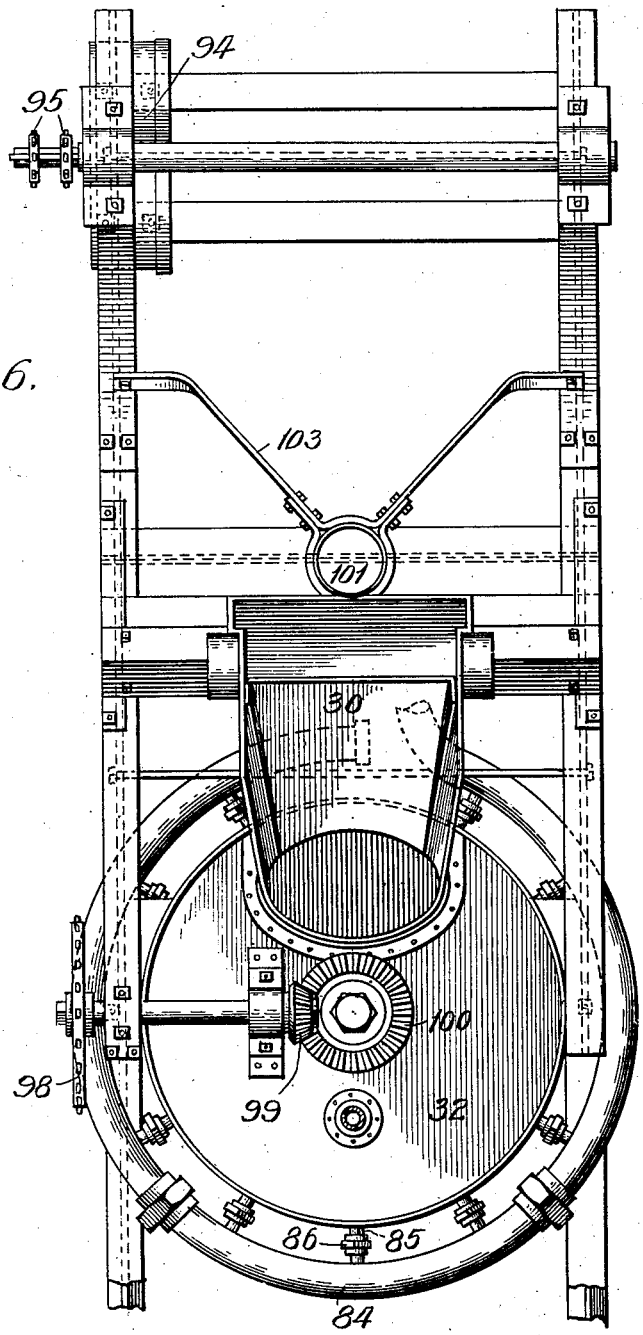

T. S. LEAKE.
APPARATUS FOR PREPARING AND HANDLING CONCRETE.
APPLICATION FILED APR. 18, 1912.
1,215,560.
Patented Feb. 13, 1917.
5 SHEETS—SHEET 5.
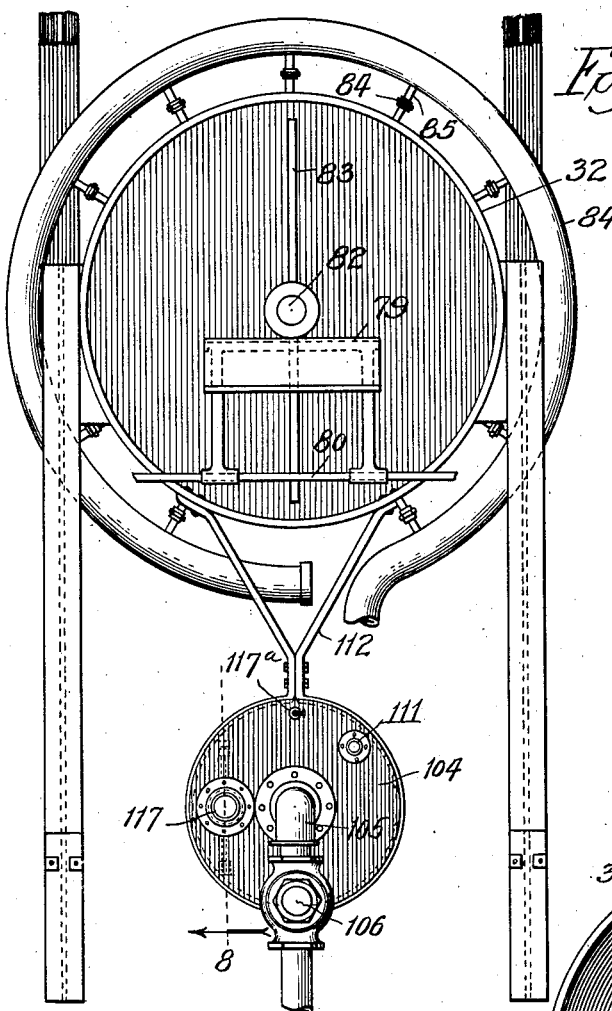
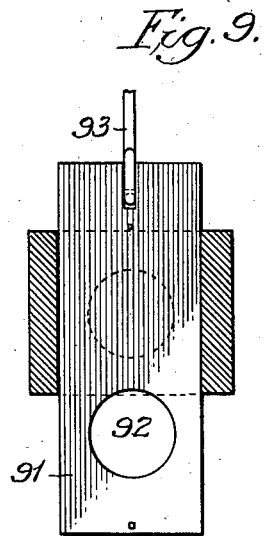
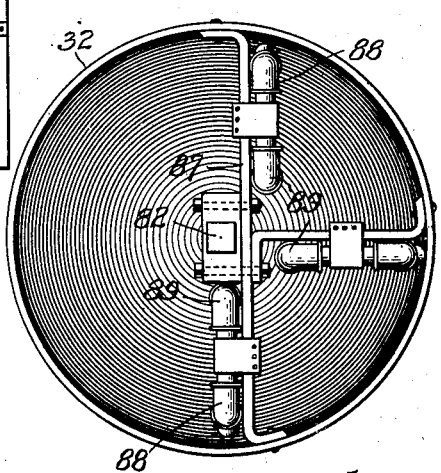
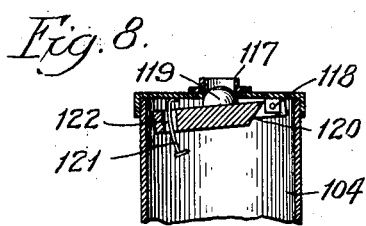

UNITED STATES PATENT OFFICE.

THOMAS S. LEAKE, OF CHICAGO, ILLINOIS, ASSIGNOR, BY MESNE ASSIGNMENTS, TO CONCRETE MIXING AND CONVEYING CO., OF CHICAGO, ILLINOIS, A CORPORATION OF ILLINOIS.

APPARATUS FOR PREPARING AND HANDLING CONCRETE.

1,215,560.      Specification of Letters Patent.      Patented Feb. 13, 1917.

Original application filed October 7, 1907, Serial No. 396,270. Divided and this application filed April 18, 1912. Serial No. 691,611.

*To all whom it may concern:*

Be it known that I, THOMAS S. LEAKE, a citizen of the United States, residing at Chicago, in the county of Cook and State of Illinois, have invented certain new and useful Improvements in Apparatus for Preparing and Handling Concrete, of which the following is a specification.

The object of my invention is to provide an improved apparatus for measuring and mixing together concrete forming elements such as crushed rock, sand, cement and water. More specifically the object of my invention is to provide an apparatus comprising two separate mixing devices, a common measuring apparatus adapted to alternately feed solid materials to the two mixing devices, a common water measuring device adapted to alternately supply water to the two mixing devices, and a common controlling mechanism for the mixing device and for the measuring devices. My invention further relates to certain improved structural features and arrangement of parts as set forth in the following specification and claims.

I do not herein claim the features of novelty and invention incident to the combined mixing and conveying apparatus which I have shown and described, as these are presented in my co-pending application Serial Number 396,270, filed October 7th, 1907, of which this application constitutes a division.

And I do not herein claim the features of novelty and invention incident to the mechanism which I have shown and described for effecting the preliminary measuring and feeding of the solid materials as these are presented and claimed in my co-pending application Serial Number 691,610, filed April 18, 1912, as a division of my said application Serial Number 396,270.

Of the drawings,

Fig. 2 is an end view of the measuring apparatus shown in the upper part of Fig. 1, the view being taken from the right hand side;

Fig. 3 is an enlarged section taken on the line 3—3 of Fig. 1;

Fig. 4, is a vertical cross sectional view taken through the center of the left hand mixing receptacle, shown in Fig. 1;

Fig. 5 is an enlarged sectional view of the water feed pipe shown in Fig. 4;

Fig. 6 is a plan view of the mixing receptacle and adjacent parts shown in the lower left hand part of Fig. 1;

Fig. 7 is a sectional plan view of the mixing receptacle shown in the lower left hand part of Fig. 1, together with certain adjacent parts;

Fig. 8 is a sectional view taken along the line 8—8 of Fig. 7;

Fig. 9 is a plan view of the valve at the bottom of one of the mixing receptacles;

Fig. 10 is a transverse sectional view of one of the mixing receptacles, the view being taken along the line 10—10 of Fig. 4.

Figure 1:
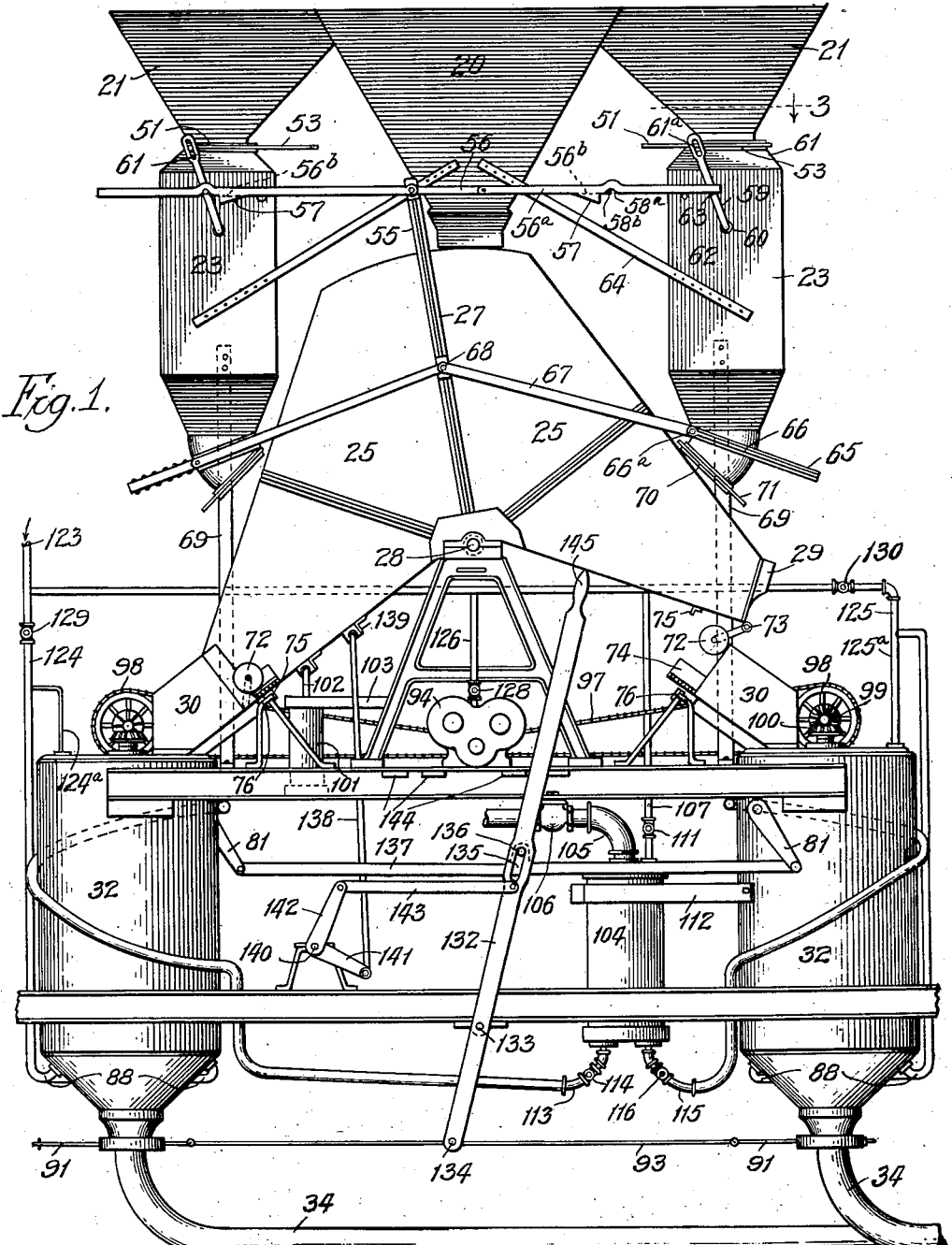
Figure 1, is a side elevation of a mechanism embodying my invention.

Referring to the drawings 20 represents a bin for holding gravel or broken rock adapted to be used in forming concrete. On each side of the bin 20 are sand and cement bins 21 and below the bins 21 are measuring chambers or receptacles 23. The receptacles 23 are connected with the bins 20 by means of supporting braces 64. The receptacles 23 are supported from the other parts of the frame of the mechanism by means of vertical columns 69, 69. Each of the bins 20 is divided by a partition 48 into two compartments 49 and 50, clearly shown in Fig. 3. The larger compartment is for sand and the smaller compartment 50 is for cement. At the bottom of each bin 21 is a gate or valve 51 which simultaneously controls the openings at the bottoms of the two compartments 49 and 50. This gate slides in guides 53. Each measuring chamber or receptacle 23 is divided by a partition 24 into compartments which correspond to the compartments 49 and 50.

A tilting vessel or receptacle V is mounted on a shaft 28 below the rock bin 20. The vessel V is provided with parallel sides and with a bottom formed in two sections, each of which inclines downward away from the center, and with a central partition 27 which divides the vessel into two chambers 25, 25.

Arms 55 extend upward at the front and rear of the vessel V and each has connected to it links 56 for controlling the valves 51, 51, of the bins 21, 21. Each bin is provided with levers 59 which are pivoted at 60 and which have slots 61 engaging pins 61$^a$ on the valve 51. Each lever 59 is provided with a horizontal pin 62 and each link 56 has pivotally connected to its end two parallel links 56$^a$ and 56$^b$. The links 56$^a$ and 56$^b$ are respectively provided with teeth 58$^a$ and 58$^b$, the teeth being oppositely beveled so that one of them 58$^a$ will engage the corresponding pin 62 to pull but not push, while the other of them, 58$^b$, will engage the pin to push but not pull. Each link 56$^a$ is also provided with a second beveled tooth or lug 57 adapted to co-act with a stud 63 projecting from the wall of the corresponding receptacle 23. When the tilting vessel V is moved from the left hand position shown in Fig. 1, to the right hand position, the lugs 58$^a$ on the left hand levers 56$^a$ engage the left hand pins 62 and move the valve 51 of the left hand bin 21 to open position. After the valve has been opened the lugs 57 engage the pins 63 and lift the levers 56$^a$ to disengage the teeth 58$^a$ from the pins. During the same movement of the tilting vessel and of the levers, the teeth 58$^b$ on the right hand levers 56$^b$ engage the right hand pins 62 and cause the valve 51 of the right hand bin 21 to be closed. When the parts are moved in the opposite directions the steps which I have described are reversed and the right hand valve 51 is opened and the left hand valve 51 is closed.

The bottom of each measuring receptacle 23 is controlled by a gate or valve 66 adapted to slide in a guide 65. Two pairs of links 67, 67, are pivoted to the vessel at 68 on the front and rear and each is pivotally connected at its other end 65$^a$ to one of the valves 66. When the vessel V is in the left hand position the left hand valve 66 is open and the right hand valve is closed. When the vessel is moved to the right hand position the left hand valve is closed and the right hand valve is open.

At the bottom of each receptacle 23 there is also provided a manually controllable slide valve or gate 70 provided with a handle 71. This valve is intended to be suitably adjusted to regulate the rate of flow of materials out of the receptacle when the valve 66 is open.

Each chamber 25 of the tilting vessel V is closed at its lower outer extremity by means of a gate 29 pivoted to swing about an axis at 73. 72, 72, are counter-weights which normally serve to hold the gate in operative closed position. 30, 30, are chutes each arranged to aline with one of the lower outer parts of the vessel, the left hand chute alining with the vessel when it is in its left hand position, and the right hand chute alining with the vessel in its right hand position. Adjacent each chute 30 is a stop 74 arranged to engage the counter-weights 72 and through them to move the gate 29 into open position as the corresponding part of the vessel comes into alinement with the chute. Stops 75, 76, are provided to limit the oscillating movement of the vessel V.

132 is an operating lever suitably pivoted at 133, and provided at its upper end with a handle 145. Pivoted at 140 is a bell crank having arms 141, and 142. The arm 142 is connected with the lever 132 by means of a link 143 and the arm 141 is connected to the tilting vessel V by means of a link 138 pivotally connected to the vessel at 139. 144, 144, are stops or catches mounted on the main frame of the mechanism and adapted to engage the lever 132 to lock it with the tilting vessel in one position or the other.

101 is a dash-pot connected by a link 102 to the tilting vessel V in such a way as to retard its movement and take up shock.

32, 32, represent mixing receptacles suitably arranged to receive materials discharged from the chutes 30, 30. Each receptacle is preferably cylindrical in form and is provided with a conical bottom. Communicating with the bottom of each receptacle at its apex is a discharge or delivery conduit 34 which may lead to points at which the concrete is to be used. The conduits 34, 34, for the two receptacles may be entirely separated or may be joined into a single conduit at some suitable point. Each conduit 34 is provided with a slide valve 91 provided with an opening 92 adapted when the valve is in one position to register with the opening through the conduit.

Each receptacle 32 is provided with an opening 77 through which material can pass and each is provided with a segmental valve 79 mounted on a shaft 80 and adapted to engage with a curved surface 78 at the lower edge of the opening 77 to close the opening. The shaft 80 of each valve has connected to it a crank 81 by means of which the valve can be moved in the manner to be hereinafter set forth.

At the center of each mixing receptacle 32 there is a vertically rotatable shaft 82 upon which are mounted inclined stirring paddles 83, 83. The shaft is supported at its lower end by means of a transverse framework 87 and at its upper end has a bearing secured to the top of the receptacle. At the lower end of the shaft below the framework 87 are additional stirrers or paddles 90, 90. The shaft 82 carries at its upper end a bevel gear 100 which meshes with a bevel pinion 99 on a horizontal shaft to which is also secured a sprocket wheel 98.

94 is an air motor mounted on the framework of the machine preferably between the two mixing receptacles 32. The shaft of the motor is provided with sprocket wheels 95 and drive chains 97—97 extend over the sprocket wheels 95, 95, and the sprocket 98, 98, on the mixing receptacles. In this way power is transmitted from the motor to continually drive the stirring devices in the receptacles.

Pipes 124$^a$ and 125$^a$ communicate with the interiors of the receptacles near the upper parts thereof and are adapted to supply air under pressure to the receptacles for a purpose to be described. Mounted upon the framework 87 in the lower part of each receptacle are nozzles 89, 89, at the ends of pipes 88, 88. These nozzles 89, 89, are arranged to deliver jets of air or other fluid vertically downward toward and into the discharge or delivery conduit 34.

Arranged about each receptacle 32 is a spiral pipe or manifold 84, to which water can be supplied. A plurality of short pipes or nipples 85 provide communication from the manifold 84 to the receptacle 32. Each pipe 85 preferably comprises two separate sections connected by a union 86.

105 is a water measuring receptacle arranged to receive water through the pipe 104 controlled by the check valve 106. A compressed air pipe 107 controlled by a valve 111 communicates with the receptacle 104 at its top. Water discharge pipes 113 and 115 lead from the measuring receptacle 104 and communicate with the spiral pipes or manifolds 84, 84. Valves 114 and 116 are provided for controlling the flow of water through the pipes 113 and 115 respectively. An opening 117 is provided in the top of the receptacle 104 (see Fig. 8) and this is controlled by a float valve 119 mounted on the arm 120 which is pivoted at 118. The arm 120 is apertured at 122, a guide and stop extending through the aperture. The pet cock 117$^a$ is provided at the top of the receptacle.

123 is the main air supply pipe for the apparatus as a whole and is provided with a number of branches. One of the branches 124 is controlled by a valve 129 and has two forks one of which leads to the pipes 88, 88, and the nozzles 89, 89, at the bottom of the left hand receptacle 32, and the other of which 124$^a$ leads to the top of the left hand receptacle 32. Another branch 125 of the pipe 123 is controlled by a valve 130 and has two forks one of which leads to the pipes 88, 88, and, nozzles 89, 89, at the bottom of the right hand receptacle 32, and the other of which 125$^a$ communicates with the top of the receptacle 32. Another branch 126 of the pipe 123 leads to the air motor 94 and is controlled by the valve 128. A fourth branch of the pipe 123 is the pipe 107 which has been before referred to as leading to the water measuring receptacle 104.

The valves at the tops and at the bottoms of the receptacles 32 are preferably controlled by the same operating lever 132 which controls the measuring apparatus for the solid materials. The valves 79, 79 are controlled by means of the cranks 81, 81, and a link 137 which connects the two cranks. This link has a pin 136 which extends through a slot 135 in the lever 132. It will be apparent from an inspection of the drawings that when the lever 132 is shifted the cranks 81, 81, will be operated to open and close the valves 79, 79. The slide valves 91, 91, have connected to them links 93, 93 which are pivotally connected at 134 to the lower end of the operating lever 132. It will be apparent that when the lever is moved the links 93, 93 will act to open and close the valves 91, 91.

In operation each of the bins 20, and 21, 21, are kept filled with the proper materials, gravel or crushed rock being placed in the bin 20, sand in the compartments 49 of the bins 21, and cement in the compartments 48 of the bins 21. The bin 20 is open at its bottom and the rock therefore flows out until one or the other of the chambers 25 (for instance the right hand one) is filled. The gate 29 being closed prevents the rock flowing out of the chamber. At the same time sand and cement flow from the compartments of the bin 21 to fill the corresponding compartments of the receptacle 23.

It will be understood that while these steps are taking place the vessel V is held locked in its left hand position because of the engagement of the lever 132 with the right hand set of stops 144. However when the chamber 25 and the chambers in the receptacle 23 have all been filled an operator releases the lever 132 from engagement with the catches and the vessel V thereupon automatically moves under the weight of the rock on the right hand side to its right hand position. As this movement takes place the right hand valve 66 is opened and the right hand valve 51 is simultaneously closed, the flow of material into the receptacle being thus stopped, and the flow of material out of the receptacle being thus permitted. At the same time the valve 66 at the bottom of the left hand receptacle 23 is closed and the valve 51 at the top is opened, and the left hand receptacle is permitted to fill with sand and cement. It will be noted that the movement of the vessel to its right hand position also permits the left hand chamber 25 to be filled with rock from the bin 20. As the right hand chamber 25 moves into alinement with the right hand chute 30, the corresponding gate 29 is automatically opened and the valve 79 at the top of the right hand receptacle 32 is also automatically opened by means of the link 137 and the crank 81. As soon as the gate 29 and the valve 79 are opened the rock from the chamber 25 and the sand and cement from the receptacle 23 flow together into the receptacle 32, a partial mixing of the three materials being thus immediately effected. As soon as the materials have all passed into the right hand receptacle 32 the lever 132 can be again released, this time from the left hand set of catches 144 and the parts will automatically move to permit the filling of the left hand receptacle 32.

By properly proportioning the chambers for the three kinds of materials any desired proportion of materials can be delivered to the mixing devices. By properly adjusting the valves 71, 71, the rate of flow of sand and cement can be regulated to insure the best possible preliminary mixing with the rock. It will be noticed that the entire operation is automatic except for the releasing of the lever 132 by the operator. The operator, however, needs to apply no power as the movement of the mechanism takes place by gravity.

It will be understood that the rotary mixing devices in the receptacles are continuously in operation and that mechanical mixing of the solid materials therefore takes place as soon as they are introduced. As soon as the materials are in the receptacle the contents of the water receptacle 104 can be at once discharged into the receptacle 32 by opening the air valve 111 and the valve 114 or 116 as the case may be. As soon as the air is admitted to the receptacle 104 it at once forces the water out through the manifold and into the mixing receptacle. The float valve 119 serves to prevent the escape of air at the top of the receptacle 104 while the water is being expelled and the check valve 106 prevents air from flowing backward through the pipe 105. As soon as the water has been all expelled the valve 111 is closed and also the valve 114 or 116 at the bottom of the receptacle. As soon as these valves are closed water at once commences to flow through the pipe 105 to fill the receptacle, air escaping from the receptacle through the opening 117. As soon as the receptacle is filled the float valve closes the opening 117 and further flow of water is stopped.

After the solid materials have been introduced into one of the receptacles 132 and after the water has been introduced in the manner described mechanical mixing is continued as long as is deemed necessary. It is found however that very short mechanical mixing is needed as the mixing even if incomplete will be made complete by the movement of the materials through the conduit 34. After there has been sufficient mechanical mixing of the materials the operator releases the lever 132 and the vessel V automatically tilts in the manner which has been described and the parts operate to fill the other receptacle 32. At the same time the valve 79 at the top of the first receptacle 32 is automatically closed and the valve 91 at the bottom is automatically opened. The operator then opens the air valve 129 or 130 as the case may be. Pressure is thus introduced into the receptacle 32 to act upon the top of the mass of more or less completely mixed material to press it downward toward and through the entrance to the delivery conduit 34. This downward movement of the material is powerfully assisted by the action of the jets of air delivered through the nozzles 89. These jets move at high velocity and can be considered as directly impinging upon small sub-masses of the material to advance them. The supplemental stirrers 90, 90, in front of the nozzles serve to prevent any possible choking of materials at the entrance to the conduit.

Not only does the water which enters through the spiral duct 84 and the feed ducts 85, distributed approximately uniformly, both vertically and radially, supply the water for hydrating the cement and moistening the rock and sand but also insures that the inner walls of the receptacle shall be maintained substantially uniformly moistened, so that the charge can be easily expelled under the action of the air.

It will be observed that the apparatus which I have provided is capable of delivering concrete substantially continuously. One receptacle 32 can be filled while mixing is taking place in the other and mixed batches of concrete can be alternately expelled from the receptacles in rapid succession. The apparatus is actuated entirely by compressed air and can therefore be placed in any convenient plate to which a supply of compressed air can be conducted. The apparatus can be controlled with very little effort on the part of an operator, it simply being necessary for him to release the lever 132 from time to time and to open and close the several valves which have been referred to.

What I claim is:

1. In a mechanism for forming a mixed concrete mass, the combination of two separate receptacles adapted to receive and hold a mass of concrete forming materials, each receptacle being provided with a feed aperture near its top and a discharge aperture near its bottom, valves for the discharge apertures, means for mixing materials in the two receptacles, a feeding apparatus arranged to deliver materials first through the feed aperture of one receptacle and then through the feed aperture of the other receptacle, and means operatively connected with the feeding apparatus for closing the valve at the bottom of the receptacle to which material is delivered by the feeding apparatus and opening the valve at the bottom of the other receptacle.

2. In a mechanism for forming a mixed concrete mass, the combination of two separate receptacles adapted to receive and hold a mass of concrete forming materials, each receptacle being provided with a feed aperture near its top, valves for the feed apertures, means for mixing materials in the two receptacles, a feeding apparatus arranged to deliver materials first through the feed aperture of one receptacle and then through the feed aperture of the other receptacle, and means operatively connected with the feeding apparatus for opening the valve for the feed aperture of the receptacle to which material is delivered by the feeding apparatus and closing the valve for the feed aperture of the other receptacle.

3. In a mechanism for forming a mixed concrete mass, the combination of two separate receptacles adapted to receive and hold a mass of concrete forming materials, each receptacle being provided with a feed aperture near its top and a discharge aperture near its bottom, valves for the feed apertures, valves for the discharge apertures, a feeding mechanism for delivering materials first through the feed aperture of one receptacle and then through the feed aperture of the other receptacle, means operatively connected with the feeding apparatus for opening the valve at the feed aperture of the receptacle to which material is delivered by the feeding apparatus and closing the valve at the discharge aperture of the same receptacle and for simultaneously closing the valve at the feed opening of the other receptacle and opening the valve at the discharge opening of the said other receptacle, and means for mixing the material which is delivered to the receptacle.

4. In a mechanism for forming a mixed concrete mass, the combination of two separate receptacles adapted to receive and hold a mass of concrete forming materials, each receptacle being provided with a feed aperture near its top and a discharge aperture near its bottom, valves for the discharge apertures, valves for the feed apertures, means for opening the discharge valve of one receptacle and closing the discharge valve of the other and for simultaneously closing the feed valve of the first receptacle and opening the feed valve of the second receptacle, and means for mixing the material which is delivered to the receptacle.

5. In a concrete mixing apparatus, a mixing chamber adapted to have separated charges of concrete mixed therein and to receive therefor quantities of rock, sand, cement and water proportioned for said charges, and having a feed aperture and a discharge aperture, a valve for the feed aperture, a valve for the discharge aperture, a shifting measuring mechanism above the feed opening having a discharge duct which registers with the said opening when the vessel is in one position, a gate in the duct of the measuring vessel, a valve for the discharge aperture of the receptacle, and means to open the gate and the valve of the feed aperture when the vessel shifts toward the mixing chamber and to open the valve for the discharge opening of the mixing chamber.

6. In a concrete mixer, a mixing chamber having valved openings at the top and bottom, a shifting measuring vessel adapted in one position to discharge into the upper opening and in another position to be out of register with the said opening, and connections from the vessel to the valves whereby the top valve is opened and the bottom valve is closed when the measuring vessel is in position to discharge into the upper opening, and whereby the top valve is closed and the bottom valve is opened when the measuring vessel is in another position.

7. The herein described method of preparing and conveying to the place of deposit and use the constituent materials, to wit, rock pieces, sand and cement, which are to constitute at said place of deposit a mass of concrete building material, the same consisting in introducing into a common receiver in proper proportions the several said constituents in an initially unmixed condition and commingling them by a mechanical stirring action, supplying a mass of water as a constituent of the concrete supplemental to the constituents aforesaid causing contact of the water with the cement by said stirring action, supplying air under pressure behind the commingled mass of concrete ingredients, and by means of the said air causing the sub-masses to change their positions in relation to each other and, while so moving or being displaced relatively to each other, to pass from the said receiver to and through a reduced delivery duct to said point of deposit and use.

8. The herein described method of preparing and conveying masses of concrete forming materials, which consists in introducing the constituent materials, to wit, rock, sand, cement and water, into a receiver in initially unmixed condition, stirring the cement, sand, rock and water together and thereby distributing the water among the solid particles and hydrating the cement, closing the said receiver against air escape except at the place of discharge, conveying the mass containing the said several constituents from the receiver by a body of compressed air through a delivery duct to a point of deposit and use, and effecting the thorough mixing of the materials after introduction into the receiver and prior to discharge from the delivery duct.

In testimony whereof, I have subscribed my name.

THOMAS S. LEAKE.

Witnesses:
HENRY A. PARKS,
EDYTHE M. ANDERSON.